United States Patent [19]
Nonaka et al.

[11] Patent Number: 5,430,698
[45] Date of Patent: Jul. 4, 1995

[54] CD PLAYING APPARATUS

[75] Inventors: Yoshiya Nonaka; Yoshio Aoyagi; Hiroyuki Abe; Alex Bradshaw; Kazuhiro Kiyoura; Seiji Kato; Koichiro Haraguchi, all of Kawagoe, Japan

[73] Assignee: Pioneer Electronic Corporation, Tokyo, Japan

[21] Appl. No.: 320,788

[22] Filed: Oct. 11, 1994

Related U.S. Application Data

[63] Continuation of Ser. No. 6,844, Jan. 22, 1993, abandoned.

[30] Foreign Application Priority Data

Jan. 24, 1992 [JP] Japan .................. 4-011442

[51] Int. Cl.[6] .............................................. G11B 7/00
[52] U.S. Cl. ............................... 369/32; 369/48; 369/58
[58] Field of Search .............. 369/32, 44.27, 44.29, 369/44.28, 48, 58, 44.26; 360/72.2, 48

[56] References Cited

U.S. PATENT DOCUMENTS

| | | | |
|---|---|---|---|
| 4,893,199 | 1/1990 | Okada | 360/48 |
| 5,065,388 | 11/1991 | Roth et al. | 360/72.2 |
| 5,124,963 | 6/1992 | Ando | 369/58 |
| 5,177,720 | 1/1993 | Kondo | 369/48 |
| 5,206,850 | 4/1993 | Tezuka et al. | 369/48 |
| 5,243,582 | 7/1993 | Yamauchi et al. | 369/48 |

Primary Examiner—Georgia Y. Epps
Assistant Examiner—Nabil Hindi
Attorney, Agent, or Firm—Cushman, Darby & Cushman

[57] ABSTRACT

A playing apparatus for a compact disc on which TOC information comprising at least first to third point data has repetitively been recorded in a lead-in area. A reading point by a pickup is moved in the lead-in area from the disc outer rim side in accordance with a TOC information reading command. When it is detected that the reading point was positioned to a recording track of third point data locating on the disc inner rim side in each of the TOC information, the reading point is jumped to the disc inner rim side by at least only two tracks. After that, the reading point is moved toward the disc outer rim side along the track, thereby reading the TOC information including the first, second, and third point data.

3 Claims, 6 Drawing Sheets

CD-R BLANK DISK

FIG. 1(c) (PRIOR ART)

CD-R PARTIALLY RECORDED DISK (PRD)

FIG. 1(d) (PRIOR ART)

CD-R FINALIZED DISK

| | POINT | PMIN | PSEC | PFRAME | |
|---|---|---|---|---|---|
| INNER RIM | 01 | 00 | 02 | 30 | ⎫ |
| | ⋮ | | | | ⎬ MUSIC PROGRAM RECORDING |
| | 07 | 50 | 26 | 50 | ⎬ INFORMATION MDATA |
| | 07 | 50 | 26 | 50 | ⎬ (7 MUSIC PROGRAMS) |
| | 07 | 50 | 26 | 50 | ⎭ |
| | A0 | 01 | 00 | 00 | ⎫ FIRST RECORDING MUSIC |
| | A0 | 01 | 00 | 00 | ⎬ PROGRAM NO. FTNO |
| | A0 | 01 | 00 | 00 | ⎭ (=1) |
| | A1 | 07 | 00 | 00 | ⎫ LAST RECORDING MUSIC |
| | A1 | 07 | 00 | 00 | ⎬ PROGRAM NO. LTNO |
| | A1 | 07 | 00 | 00 | ⎭ (=7) |
| | A2 | 57 | 18 | 05 | ⎫ |
| | A2 | 57 | 18 | 05 | ⎬ ABSOLUTE TIME AT WHICH THE |
| | A2 | 57 | 18 | 05 | ⎭ LEAD-OUT AREA STARTS ATLO |
| OUTER RIM | 01 | 00 | 02 | 30 | |
| | ⋮ (REPEATED AFTER THAT) | | | | |

(DATA REPRODUCING DIRECTION: inner rim → outer rim)
(JUMP BACK BY 1 TRACK)

CD PLAYING APPARATUS

This is a continuation of application Ser. No. 08/006,844, filed on Jan. 22, 1993, which was abandoned.

BACKGROUND OF THE INVENTION

1. Field of the Invention

The present invention relates to a CD (compact disc) playing apparatus and, more particularly, to an apparatus which can play a writable CD-R (CD recordable) finalized disc.

2. Description of the Related Background Art

Figure 1A:
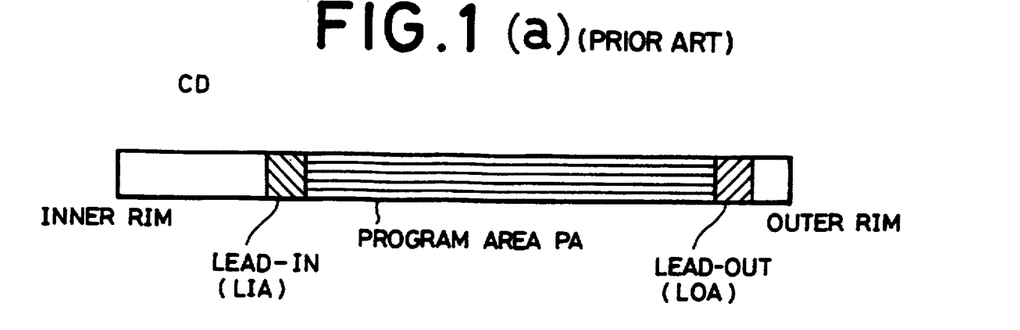
FIGS. 1(a)–1(d) is a diagram showing recording states of a CD and a CD-R.

Hitherto, a CD (compact disc) is known as a recording medium which records audio information or the like. As shown in FIG. 1(a), a lead-in area LIA in which index information of recording information has been recorded, a program area PA in which music information or the like has actually been recorded, and a lead-out area LOA indicative of the end of the program area PA are formed on the CD in order from the inner rim of the disc. The lead-in area LIA, program area PA, and lead-out area LOA are totally called an information area. A signal to be recorded is an EFM (Eight to Fourteen Modulation) modulated digital signal and includes not only main codes (main information) such as music information but also sub codes such as a time code (time information). Index information called a TOC (Table of Contents) is recorded in the lead-in area LIA. A total recording information segment number (for example, the total number of music programs) in the program area of the disc, a total recording time (for instance, the total playing time), and the like are recorded as sub codes in the lead-in area LIA. The main codes are recorded in the program area PA. A track number (TNO) indicative of the recording information segment number (for example, the music program number), a recording time (P-TIME: for instance, the playing time of the relevant music program) from the start of the relevant track, a total recording time (A-TIME: for instance, the total playing time) which is measured from the track number=1, and the like are recorded in the Q channel of the sub codes. A lead-out code indicative of the lead-out area is recorded in the lead-out area LOA.

Figure 1B:
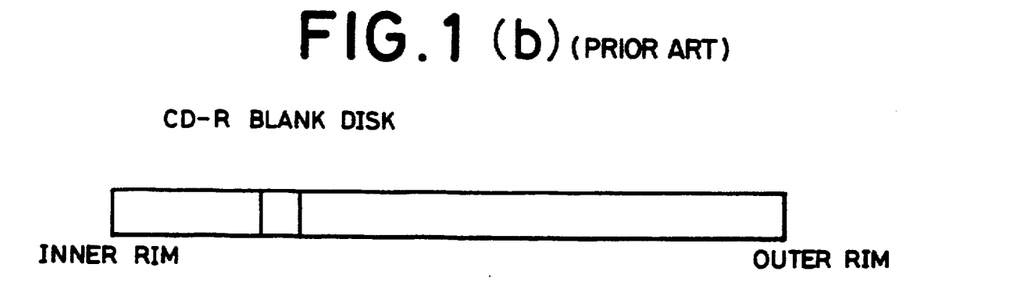
Figure 1C:
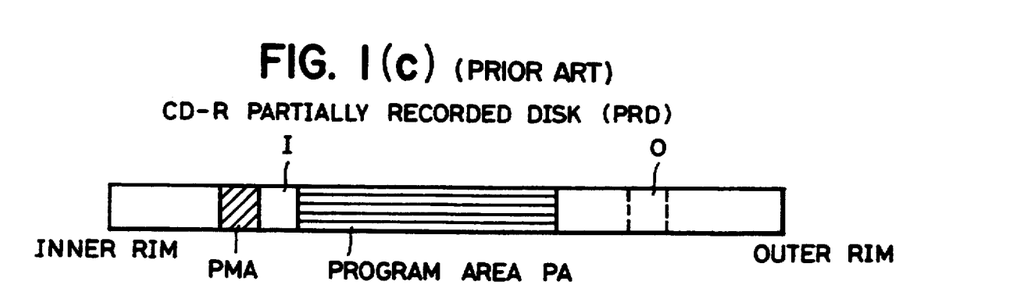
Figure 1D:
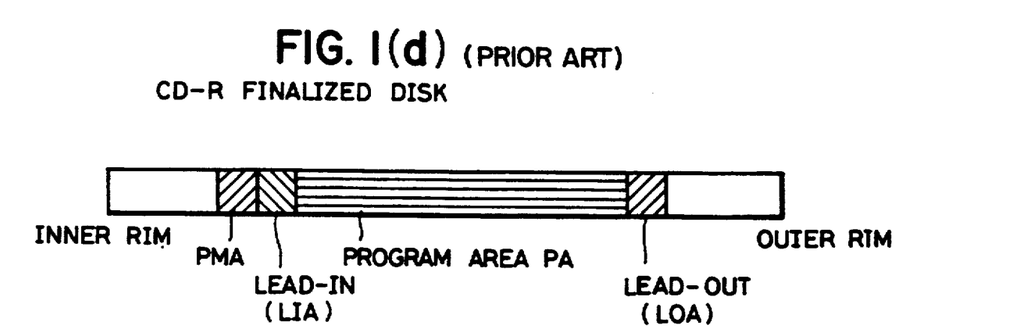

Although the CD having such a recording format is a read only recording medium, a CD-R which can write information while using a format similar to that of the CD has been developed in recent years. The recording format standard of the CD-R is unified to the standard which is generally called "orange book" and is based on the CD format standard (generally called a red book). The CD-R disc is classified into the following three types as shown in FIG. 1(b)–1(d) in accordance with the recording state. Namely, FIG. 1(b) illustrates a blank disc in an unrecording state in which no information is recorded yet.

FIG. 1(c) illustrates a partially recorded disc (hereinafter, referred to as a PRD) on which information has partially been recorded.

FIG. 1(d) illustrates a disc which has finally been formated in order to set substantially the same format as that of the CD after completion of the recording.

As shown in FIG. 1(b), even in the CD-R disc, the lead-in area LIA, program are PA, and lead-out area LOA are finally formated in a manner similar to those of the CD.

Guide grooves are formed on the recording tracks of the CD-R. The guide groove is wobbled by a signal having a frequency which is obtained by frequency modulating a carrier by data (ATIP: Absolute Time In Pregroove) indicative of the absolute time information. In an information recording and reproducing apparatus for the CD-R, information is recorded and reproduced for the blank disc or partially recorded PRD by performing a tracking and spindle control by using the guide groove. As shown in FIG. 1(b), on the PRD, a PMA (Program Memory Area) as a temporary TOC area to store the recording career of the recording information is provided on the further inner rim area of an area I which is prepared for the lead-in are LIA. The following three kinds of information are recorded in the PMA. The first information relates to skip command information and skip cancel information and is information which can skip the recording information every recording information segment (track) or can skip a part (which can be designated by the time) in the recording information segment (track) when the disc is played. The first information will be described in detail hereinlater. The second information relates to a start address, an end address, and the like of the recording information recorded in the program area and they are recorded by a format similar to that of the TOC information which is recorded in the lead-in area of the CD. The third information relates to disc identification information (option) and numeral information of six digits to identify the disc can be recorded as necessary. The reason why such information is recorded as temporary TOC into the PMA is because in the PRD, there is a possibility such that information is written into the remaining program area PA, the TOC information cannot be recorded into the lead-in area LIA until the recording completion (finalization) is finally instructed.

The PRD is set into a state in which no information is written into an area I for the lead-in area LIA and an area O for the lead-out are LOA. Each area, therefore, is held in a mirror surface state. In the information recording apparatus of the CD-R, when the finalization is instructed, in order to finally obtain the same format as that of the CD, predetermined information and the TOC information recorded in the PMA are recorded as sub codes into the area I for the lead-in area LIA and a predetermined lead-out code indicative of the lead-out area LOA is recorded into the area O for the lead-out area LOA. In the conventional CD playing apparatus, consequently, the information can be reproduced from the finalized CD-R.

In case of reading the TOC information in the conventional CD playing apparatus, point data POINT=-"AXH" (X=0, 1, 2: H denotes the hexadecimal notation) in the sub code Q data recorded in the lead-in area LIA is searched in the direction (direction from the outer rim side of the CD to the inner rim side) opposite to the direction of the recording order of the data.

a) When the first point data POINT="A0H" is found out, the TOC information is read out from the relevant position. Or, b) When the second point data POINT="A1H" the third point data POINT="A2H" is located, a pickup is jumped back by one track (reverse direction jump) and is returned to the inner rim side of the recording position of the first point data POINT="A0H". See FIG. 6. Subsequently, the track is searched in the forward direction and when the first point data POINT="A0H" is found out, the TOC information is read from the position at this time point.

When the TOC information of the CD-R which has been finalized is read by a similar sequence by the conventional CD playing apparatus, in case of a disc which has been recorded in a mode 5 in which the skip information is recorded among the point data POINT="A1H", point data POINT="A2H", and point data POINT="A0H", even if the point data POINT="A1H" or point data POINT="A2H" is found out and the light spot is jumped back by one track, the light spot can be returned to only a position on the outer rim side of the recording position of the point data POINT="A0H". To find out the point data POINT="A0H", accordingly, it is necessary to skip one set of TOC information. There is, consequently, a problem such that it takes a long time to read the TOC information.

SUMMARY OF THE INVENTION

It is, therefore, an object of the present invention to provide a CD playing apparatus which can promptly read TOC information even in case of playing a finalized CD-R.

According to the present invention, there is provided a playing apparatus for a CD which has a lead-in area in that a plurality of sets of same TOC information have repetitively been recorded and on which at least first point data indicative of the number of track which was first recorded in a program area, second point data indicative of the number of track which was lastly recorded in the program area, and third point data indicative of a start time of a lead-out area have sequentially been recorded as TOC information every set from the disc inner rim side. The CD playing apparatus comprises pickup position control means for moving a reading point by a pickup in the lead-in area from the disc outer rim side in accordance with a TOC information read command, first detecting means for detecting that the reading point is located at the recording track of the third point data by the pickup position control means, means for jumping the reading point to the disc inner rim side by at least only two tracks when the first detecting means detects that the reading point has been located at the recording track of the third point data, and processing means for moving the reading point toward the disc outer rim side along the track after the pickup was jumped by at least two tracks and for reading out the TOC information including the first, second, and third point data.

According to the present invention, when the lead-in area is searched and the third point data (POINT in the sub coding Q data="A2H") is detected, the reading point of the pickup is jumped back by at least two tracks and from this position, the first point data (POINT in the sub coding Q data="A0H") is searched in the ordinary reproducing direction of the recording information. Therefore, even in the case where the disc to be reproduced is a finalized CD-R and the skip information (skip command information and skip cancel information) has been recorded among the first to third point data of the TOC information, the reading point of the pickup can be always returned to a position before the recording position of the first point data, the first point data can be detected in a short time, and the TOC information can be read. Thus, the reading time of the TOC information can be reduced.

DETAILED DESCRIPTION OF THE PREFERRED EMBODIMENT

An embodiment of the present invention will be described with reference to FIGS. 2 to 6.

Figure 2:
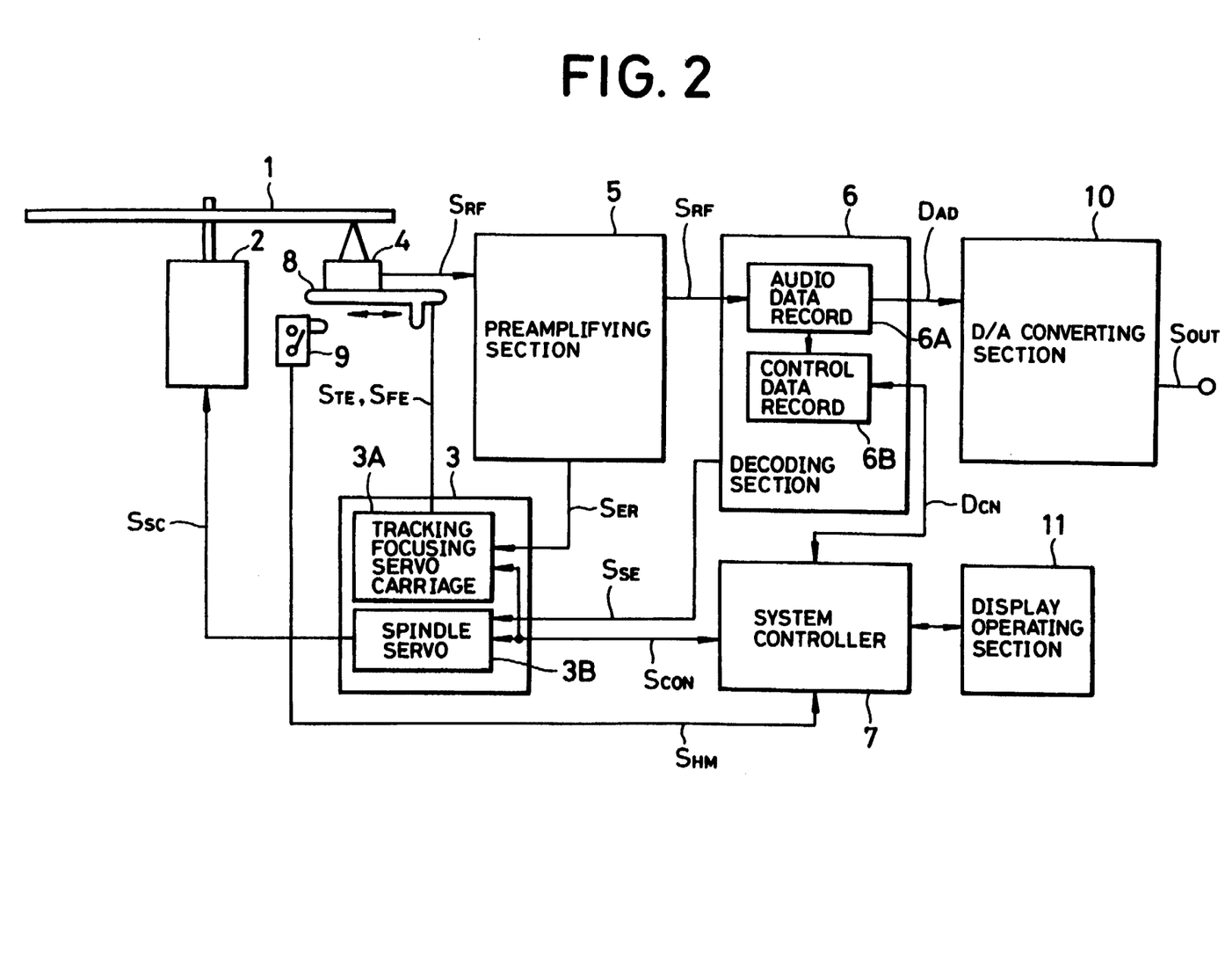
FIG. 2 is a block diagram showing an embodiment of the present invention.

FIG. 2 shows a block diagram of a fundamental construction of a CD playing apparatus according to the present invention. In the CD playing apparatus, a CD (or PRD, finalized CD-R disc) 1 to be played is put on a turntable (not shown). A spindle motor 2 rotates the CD on the basis of a spindle servo control signal $S_{SC}$ from a servo section 3. A pickup 4 reads out recorded data from the CD 1 and supplies as a reproduction RF signal $S_{RF}$ to a preamplifying section 5. The preamplifying section 5 amplifies the reproduction RF signal $S_{RF}$ and supplies to a decoding section 6. The preamplifying section 5 also produces an error signal $S_{ER}$ from the reproduction RF signal $S_{RF}$ and supplies to the servo section 3. A first servo section 3A of the servo section 3 produces a tracking error signal $S_{TE}$ and a focusing error signal $S_{FE}$ from the error signal $S_{ER}$ and a control signal $S_{CON}$ from a system controller 7, thereby executing a tracking servo and a focusing servo in the pickup 4. The first servo section 3A further executes a carriage servo to drive a carriage 8 on the basis of the control signal $S_{CON}$ from the system controller 7 and the error signal $S_{ER}$ from the preamplifying section 5. A home position detecting switch 9 to detect the home position of the carriage 8 is provided near the carriage 8. The switch 9 supplies a home position detection signal $S_{HM}$ to the system controller 7. An audio data decoding section 6A of the decoding section 6 converts the input reproduction RF signal $S_{RF}$ into a binary signal and separates a frame sync pattern and EFM demodulates. The audio data decoding section 6A executes a signal process such as error correction to the EFM demodulated signal and supplies audio data $D_{AD}$ to a D/A converting section 10. Control data included in a sub code is supplied to a control data decoding section 6B. The control data decoding section 6B decodes control data $D_{CN}$ and sends to the system controller 7. Further, the decoding section 6 produces a spindle servo error signal $S_{SE}$ from the input reproduction RF signal $S_{RF}$ and sends to a second servo section 3B. The second servo section 3B functions as a spindle servo section and supplies the spindle servo control signal $S_{SC}$ to the spindle motor 2 on the basis of the spindle servo error signal $S_{SE}$ and control signal $S_{CON}$, thereby rotating the spindle motor 2 at a predetermined rotational speed. The D/A converting section 10 D/A converts the input audio data $D_{AD}$ and generates as an audio output signal $S_{OUT}$. The system controller 7 controls the whole CD playing apparatus on the basis of control data $D_{CN}$ and an operation control signal supplied from a display operating section 11. The display operating section 11 has a display section (not shown) to display various kinds of information to the user and executes various kinds of displays under control of the system controller 7.

A recording format of the TOC information of the finalized CD-R in the embodiment of the present invention will now be described in detail.

Figure 3:
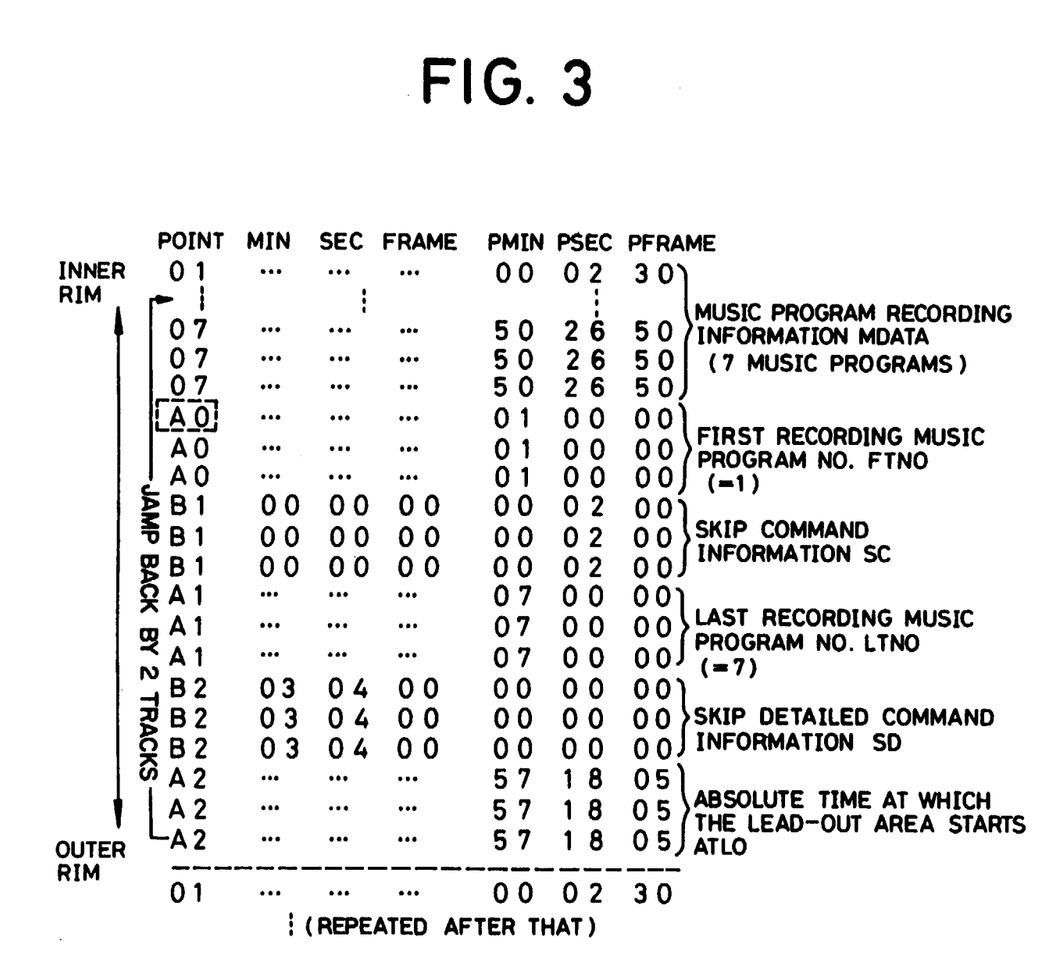
FIG. 3 is a diagram for explaining the operation of the apparatus of FIG. 2.

The recording format of the finalized CD-R includes two kinds of modes 1 and 5. According to the mode 1, the recording format with respect to the lead-in area LIA, program area PA, and lead-out area LOA of the CD-R is the same as that of the conventional CD and they can be handled in completely the same manner as the CD from a viewpoint of the CD playing apparatus side. A format of the mode 5 is used in the case where the skip command information and skip cancel information exist in the lead-in area LIA as mentioned above. In the TOC information, since the same content is repetitively recorded as shown in FIG. 3, in case of reproducing information from the position during the recording of the TOC information or even if there is a scratch or the like during the recording of certain TOC information, by reading the next TOC information, the accurate TOC information can be read.

A TOC information searching process regarding the present invention will now be described with reference to FIGS. 3 to 6. In this case, it is now assumed that a PRD is put on a turntable and the set-up operation at the home position is finished and the apparatus is in a state in which the information of the lead-in area can be read. The set-up operation denotes a preparing operation which is executed to correctly read out the recording information by moving a pickup to a predetermined position and by correctly making each servo circuit operative.

Prior to describing the embodiment of the invention, problems in the sequence of the conventional CD playing apparatus will now be described in detail.

Figure 6:
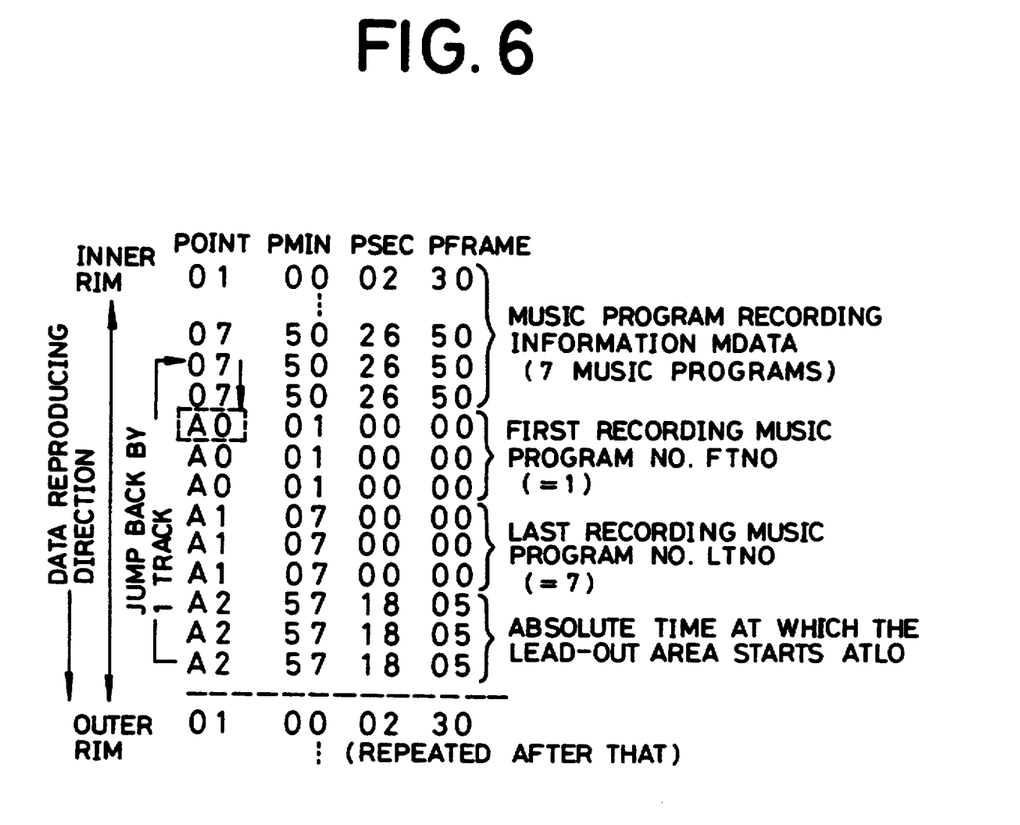
FIG. 6 is a diagram (2) for explaining a problem of the prior art.

FIG. 6 shows a concept of a construction (based on the red book) of the TOC information of a CD. Various kinds of data which are unnecessary for explanation are omitted here.

It is now assumed that music information has been recorded in the CD. In the TOC information, music program recording information MDATA (POINT=1 to 7) is first recorded. The MDATA indicates the absolute times at which the music programs recorded in the CD start. Next, first recording music program number FTNO (POINT=A0H) and last recording music program number LTNO (POINT=A1H) are recorded, and then absolute time ATLO (POINT=A2H) at which the lead-out area starts is recorded. A plurality of sets of those information are repetitively recorded in the lead-in area. Even if certain one set of TOC information cannot be read due to a scratch or the like, by reading another TOC information, the operation is not obstructed. In case of the TOC information of FIG. 5, it will be understood that the total number of music programs recorded in the CD is equal to seven, the starting music program number is set to 1, the end music program number is set to 7, and the absolute time at which the lead-out area starts is equal to 57 minutes, 18 seconds, and 5 frames.

In the above CD, in case of reading out the TOC information, the TOC information recorded before at least the second set of TOC information from the last set from the outer rim side of the lead-in area of the CD is searched. The first position at which the point data POINT="A2H" exists is detected. A pickup is jumped by one track from such a position toward the inner rim side. The ordinary reproduction is executed from the position after the reading point of the pickup was jumped and the point data POINT="A0H" is detected. The TOC information is read out from such a position at which the point data POINT="A0H" was detected.

In the CD-R, there is a case where the skip information (skip command information and skip cancel information) is disclosed in the TOC information as mentioned above. FIG. 3 shows an example of an outline of such TOC information. In FIG. 3 as well, various kinds of data which are unnecessary for the description are not shown.

Now, assuming that music information has been recorded on the CD-R disc, the music program recording information MDATA (POINT=1 to 7) in which the absolute times at which the music programs recorded on the CD-R disc start are recorded is first recorded in the TOC information and the first recording music program number FTNO (POINT=A0H) is subsequently recorded. After that, skip command information SC (POINT=B1H) is recorded. The skip command information SC designates the pointer number (which is recorded in PMIN: 1 to 40) of an interval to be skipped during the reproduction and the recording information segment number (which is recorded in PSEC: 1 to 21) to be skipped during the reproduction. In the specification, only the case where there are recording information segments (music program titles) to be skipped is described.

A last recording music program number LTNO (POINT=A1H) is recorded and a skip detailed command information SD is subsequently recorded. The skip detailed command information SD designates the recording information segments (music program titles) to be skipped during the reproduction. In FIG. 3, skips of the third and fourth music programs are designated. After that, the absolute time ATLO (POINT=A2H) at which the lead-out area starts is recorded. By the above information, it will be understood that the total number of music programs recorded in the CD-R is equal to seven, the starting music program number is set to 1, the end music program number is set to 7, and the absolute time at which the lead-out area starts is set to 57 minutes, 18 seconds, and 5 frames.

Figure 5:
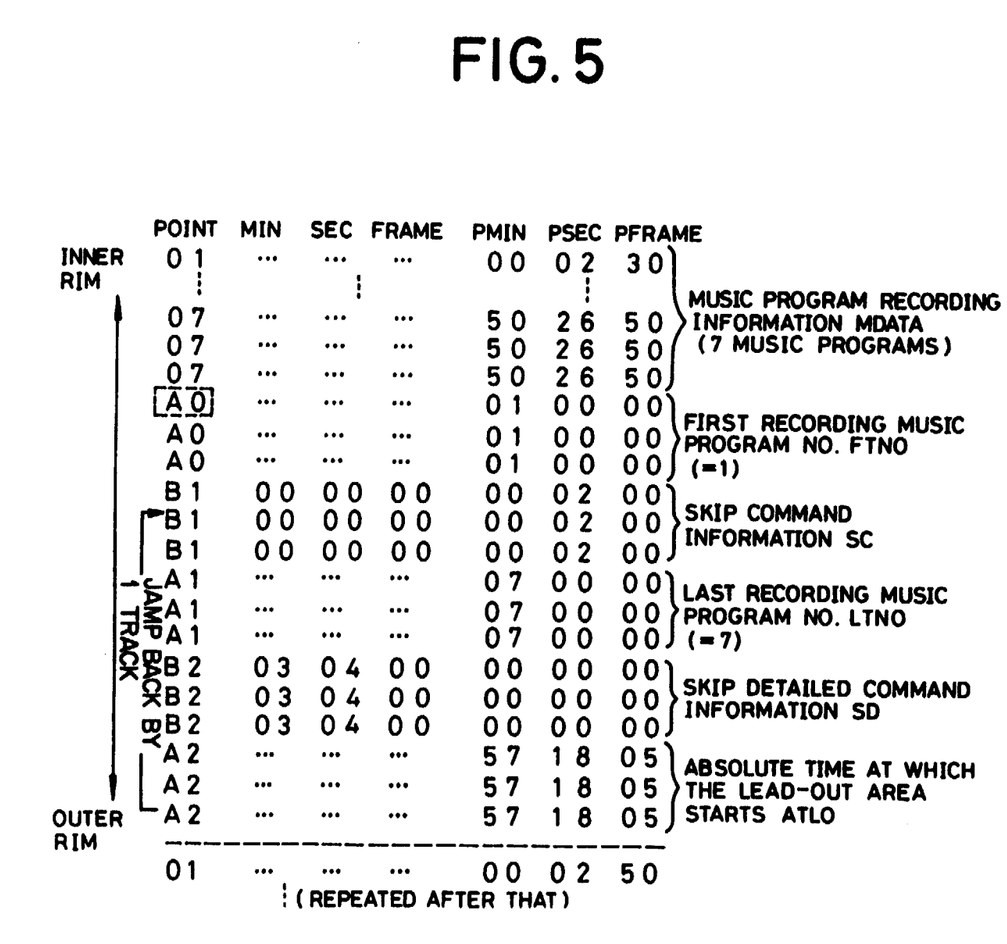
FIG. 5 is a diagram (1) for explaining a problem of the prior art.

In the CD-R disc, in case of reading out the TOC information by the conventional sequence, an information reading point by the pickup is moved from the outer rim side of the CD-R disc. The first position at which the point data POINT="A2H" exists is detected. The reading point of the pickup is jumped by one track from the detected position toward the inner rim side. The ordinary reproduction is executed from the position after the reading point of the pickup was jumped and the point data POINT="A0H" is detected. The TOC information is read from the position at which the point data POINT="A0H" was detected. Therefore, as shown in FIG. 5, even when the first position at which the point data POINT="A2H" exists is detected and the reading point of the pickup is jumped by one track from the detected position to the inner rim side, the reading point of the pickup can be returned to only a rear position during the recording of the TOC information than the recording position (recording track) of the point data POINT="A2H". The TOC information is consequently skipped and the position at which the point data POINT="A0H" of the next TOC information exists is detected, so that it takes a long time to read the TOC information.

Figure 4:
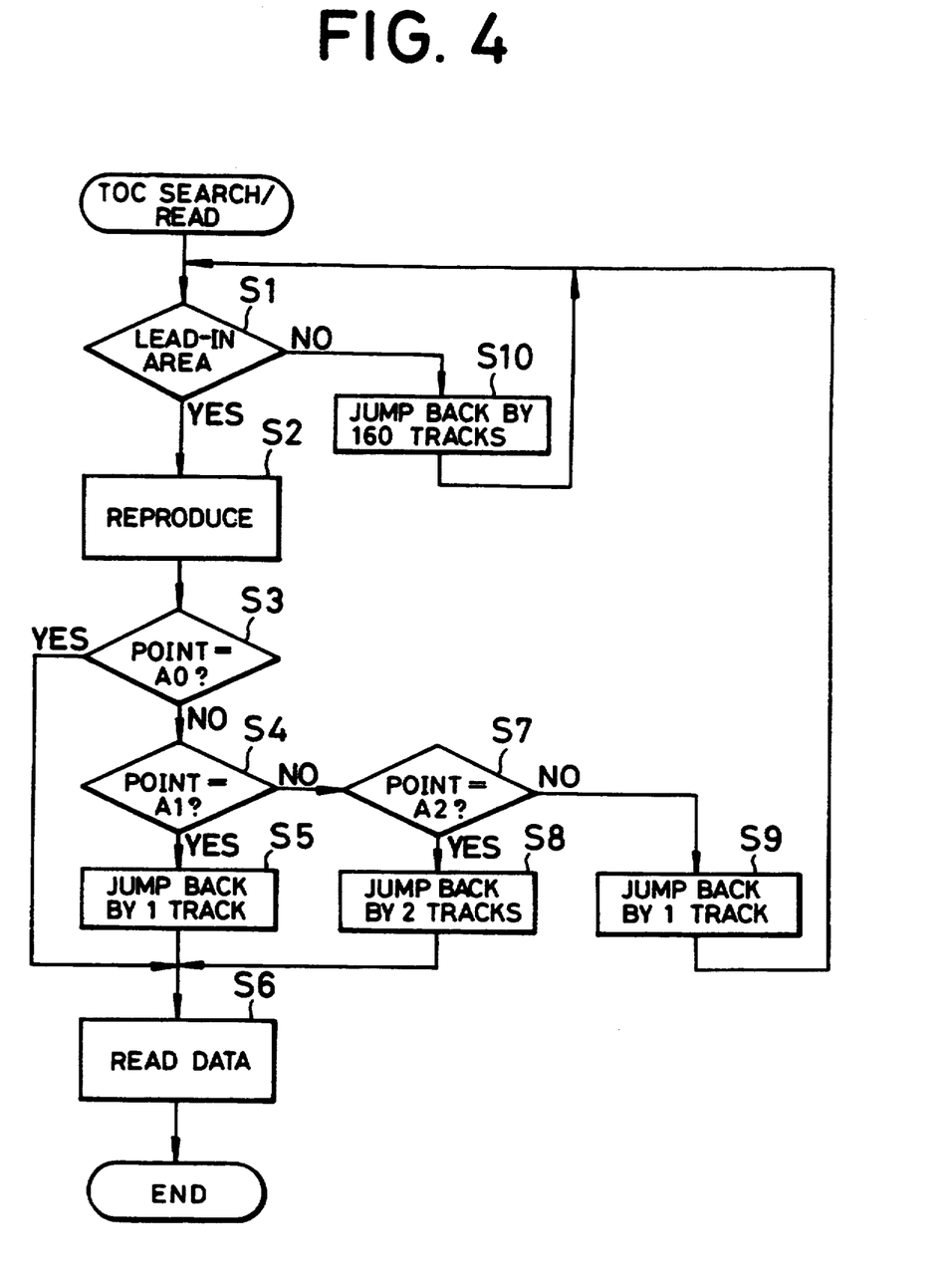
FIG. 4 is an operation flowchart of the embodiment.

In the embodiment, as shown in FIG. 3, target point data is searched from the outer rim side of the CD-R disc. More specifically speaking, when a TOC information reading command is generated by the operation of a switch (not shown) such as a disc playing switch, the system controller 7 discriminates whether the information reading point by the pickup 4 lies within the lead-in area LIA or not on the basis of the control data $D_{CN}$ as shown in FIG. 4 (step S1). When it is located out of the lead-in area LIA, the system controller 7 instructs to jump back the pickup 4 by only the maximum number of jump tracks which can be performed at once and which is obtained from a mechanical track jump limit value of the CD playing apparatus (step S10). In FIG. 4, the maximum track Jump number is set to 160 tracks.

When the reading point lies within the lead-in area, information is reproduced from the lead-in area by one track (step S2). The presence and absence of target data is detected (steps S3 to S4, S7).

When the target data doesn't exist on the relevant track, the system controller 7 repeats the operations to again generate the command for jumping back the pickup 4 by one track (step S9) and to reproduce one track, so that the point data POINT is searched.

More specifically speaking, the system controller 7 discriminates whether the point data POINT="A0H" as a first point is detected or not (step S3). When the point data POINT="A0H" is detected, the TOC information is read out (step S6).

When the point data≠"A0H", a check is subsequently made to see if the second point data POINT="A1H" or not (step S4). When the point data POINT="A1H", the command to jump back the reading point of the pickup 4 by one track is generated (step S5) in a manner similar to the conventional manner and the TOC information is read out (step S6).

When the point data POINT≠"A0H" and the point data POINT≠"A1H", a check is now made to see if the point data POINT="A2H" as a third point data or not (step S7). When the point data POINT="A2H", a command to jump back the reading point of the pickup 4 by two tracks is generated (step S8) in order to certainly return the pickup 4 from the above position to a position before the position at which the point data POINT="A0H" has been recorded. After that, the TOC information is read out (step S6). In this case, it is sufficient to jump back the reading point of the pickup 4 by at least two or more tracks. It is, however, most preferable to jump back the reading point of the pickup 4 by two tracks from a viewpoint of reduction of the searching time. Due to this, when the ordinary reproduction is executed from the recording track after the jumping operation, the point data POINT="A0H" is certainly recorded in the tracks which have been skipped by the jumping operation. Such point data, therefore, is detected and the TOC information is read out from the detected position of the point data POINT="A0H" (shown by a frame surrounded by a broken line in the diagram), so that the reading time of the TOC information is reduced.

When the point data POINT is none of "A0H", "A1H", and "A2H", the pickup 4 is Jumped back by one track and the processing routine is again repeated from step S1.

According to the embodiment as mentioned above, when the point data POINT="A2H" is detected, the pickup 4 is jumped back by two track in order to certainly return the pickup 4 from the relevant position to a position before the position at which the point data POINT="A0H" has been recorded. There is, consequently, no need to skip the TOC information and the the TOC information can be promptly read out.

Although the above embodiment has been described with respect to only the case of reading all of the TOC information after the point data POINT="A2H" was detected, the operating mode can be shifted to the ordinary reproducing operating mode even in a state in which the music program recording data MDATA cannot be read as in the case where the point data POINT="A2H" was detected by the TOC information recorded at the last position of the TOC information which has repetitively been recorded or the like.

According to the present invention, when the lead-in area is searched and the third point data (POINT="A2H" in the sub coding Q data) is detected, the reading point of the pickup is jumped back by at least two tracks and the first point data (POINT="A0H" in the sub coding Q data) is searched from the relevant position in the ordinary reproducing direction of the recording information. Therefore, even in the case where the disc to be reproduced is the finalized CD-R and the skip information (skip command information and skip cancel information) has been recorded among the first to third point data of the TOC information, the pickup can be always returned to a position before the recording position of the first point data and the first point data is searched from the relevant position in the ordinary reproducing direction of the recording information. There is, accordingly, no need to skip the TOC information and the first point data is detected in a short time and the TOC information can be read. The reading time of the TOC information can be reduced.

What is claimed is:

1. A playing apparatus for a compact disc which has a lead-in area wherein a plurality of sets of same TOC information have repetitively been recorded and wherein at least first point data indicative of a track number which has been first recorded in a program area, second point data indicative of the number of a track which was last-recorded in said program area, and third point data indicative of a start time of a lead-out area have sequentially been recorded as said TOC information every said set from a disc inner rim side, said first, second, and third point data being recorded on said disc such that said first, second, and third point data are not recorded within one track on said disc, and wherein said playing apparatus comprises:

pickup position control means for moving a reading point in said lead-in area from a disc outer rim side of said lead-in area in accordance with a command to read said TOC information;

first detecting means for detecting that said reading point was located to a recording track of said third point data by said pickup position control means;

means for allowing said reading point to be jumped to a disc inner rim side of said lead-in area by at least two tracks when said first detecting means detects that said reading point was located to the recording track of said third point data, wherein said reading point does not move in a direction toward said disc outer rim side during said at least two track jump; and processing means for moving said reading point toward the disc outer rim side along the tracks after said reading point was jumped by at least two tracks and for reading and processing said TOC information including-said first, second, and third point data.

2. An apparatus according to claim 1, further comprising:
second detecting means for detecting that said reading point was located to a recording track of said second point data by said pickup position control means; and
means for allowing said reading point to be jumped to the disc inner rim side by at least only one track when said second detecting means detects that said reading point was located to the recording track of said second point data.

3. An apparatus according to claim 1, further comprising:
third detecting means for detecting that said reading point was located to a recording track of said first point data by said pickup position control means; and
means for immediately making said processing means operative when said third detecting means detects that said reading point was located to the recording track of said third point data.

* * * * *